United States Patent
Pianowski et al.

(10) Patent No.: US 8,020,922 B2
(45) Date of Patent: Sep. 20, 2011

(54) INTERIOR TRIM COMPONENT AND METHOD OF MANUFACTURING THE SAME

(75) Inventors: John C. Pianowski, South Lyon, MI (US); Vaughn D. Vanderpool, Fowlerville, MI (US)

(73) Assignee: Magna International Inc., Aurora (CA)

( * ) Notice: Subject to any disclaimer, the term of this patent is extended or adjusted under 35 U.S.C. 154(b) by 456 days.

(21) Appl. No.: 12/057,579

(22) Filed: Mar. 28, 2008

(65) Prior Publication Data

US 2009/0200819 A1    Aug. 13, 2009

Related U.S. Application Data

(60) Provisional application No. 60/908,990, filed on Mar. 30, 2007.

(51) Int. Cl.
*B60R 13/02* (2006.01)
*B23P 11/00* (2006.01)
*B29C 65/00* (2006.01)

(52) U.S. Cl. .................................................... 296/153
(58) Field of Classification Search ................ 296/1.08, 296/146.7, 152, 39.1, 37.13, 146.6, 153; 49/502; 29/428; *B60R 13/02; B23P 11/00; B29C 65/00*
See application file for complete search history.

(56) References Cited

U.S. PATENT DOCUMENTS

| | | | | |
|---|---|---|---|---|
| 5,111,619 | A * | 5/1992 | Billin et al. | 49/502 |
| 5,529,370 | A * | 6/1996 | Veit | 296/146.7 |
| 7,051,438 | B2 * | 5/2006 | O'Brien et al. | 29/897.2 |
| 7,073,843 | B2 * | 7/2006 | Schoemann et al. | 296/146.7 |
| 7,240,955 | B2 * | 7/2007 | Twork | 296/146.7 |
| 2008/0238063 | A1 * | 10/2008 | Vanderpool | 280/752 |

OTHER PUBLICATIONS

About Kimekomi (Fabric or Quilt Balls or Dolls) (its not Temari, but a close relative), Last updated Apr. 2005, From 1998 inclusive G. Thompson.

* cited by examiner

*Primary Examiner* — Glenn Dayoan
*Assistant Examiner* — SunSurraye Westbrook
(74) *Attorney, Agent, or Firm* — Honigman

(57) ABSTRACT

An interior trim component includes a body portion defining an inboard-surface, and an outboard-surface, wherein the body portion is further defined by a groove formed in the inboard-surface, and a passage extending through the body portion from the inboard-surface to the outboard-surface; and a bolster portion including a first end portion, and a second end portion, wherein the first end portion is disposed in the groove formed in the inboard-surface, wherein the second end portion is disposed in the passage. A method is also disclosed.

14 Claims, 2 Drawing Sheets

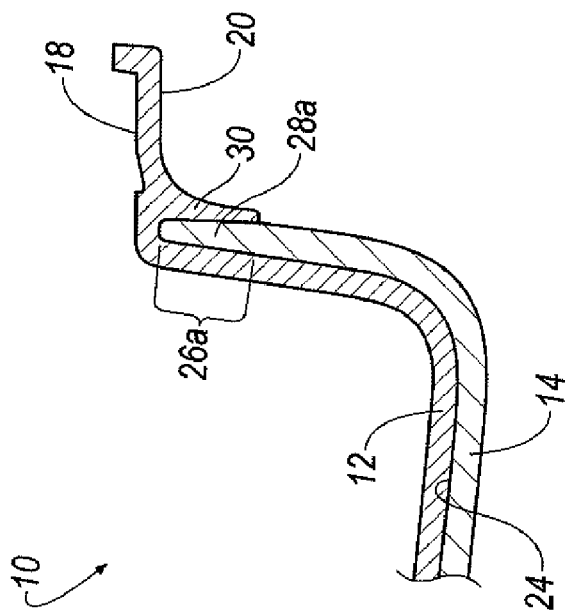
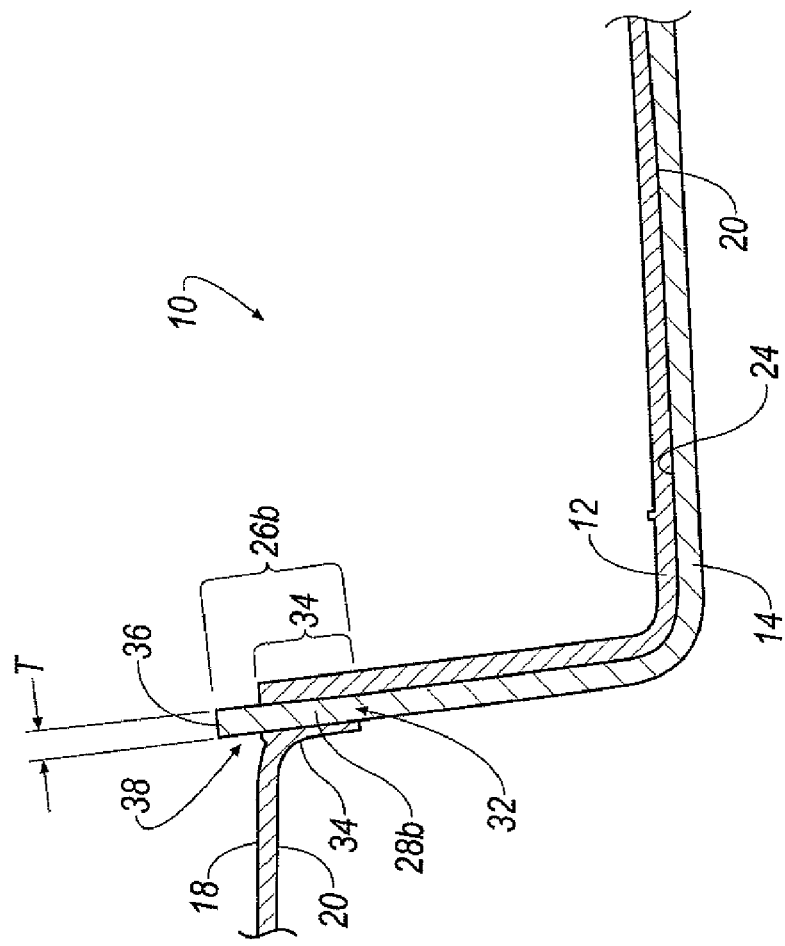

INTERIOR TRIM COMPONENT AND METHOD OF MANUFACTURING THE SAME

RELATED APPLICATION

This application claims the benefit of U.S. Provisional Patent Application No. 60/908,990 filed on Mar. 30, 2007.

BACKGROUND

It is known in the art that vehicles, such as, for example, automotive vehicles, include interior trim components. Typically, an interior trim component provides a rigid and/or soft, aesthetically-pleasing surface that trims structure of a vehicle, such as, for example, door structure, roof structure, instrument panel structure, A-pillars, B-pillars, C-pillars, or the like.

BRIEF DESCRIPTION OF THE DRAWINGS

The disclosure will now be described, by way of example, with reference to the accompanying drawings, in which:

FIG. 3A is a cross-sectional view of the interior trim component of FIG. 1 in accordance with an exemplary embodiment of the invention; and FIG. 3B is a cross-sectional view of the interior trim component of FIG. 1 in accordance with an exemplary embodiment of the invention.

DETAILED DESCRIPTION

Figure 1:
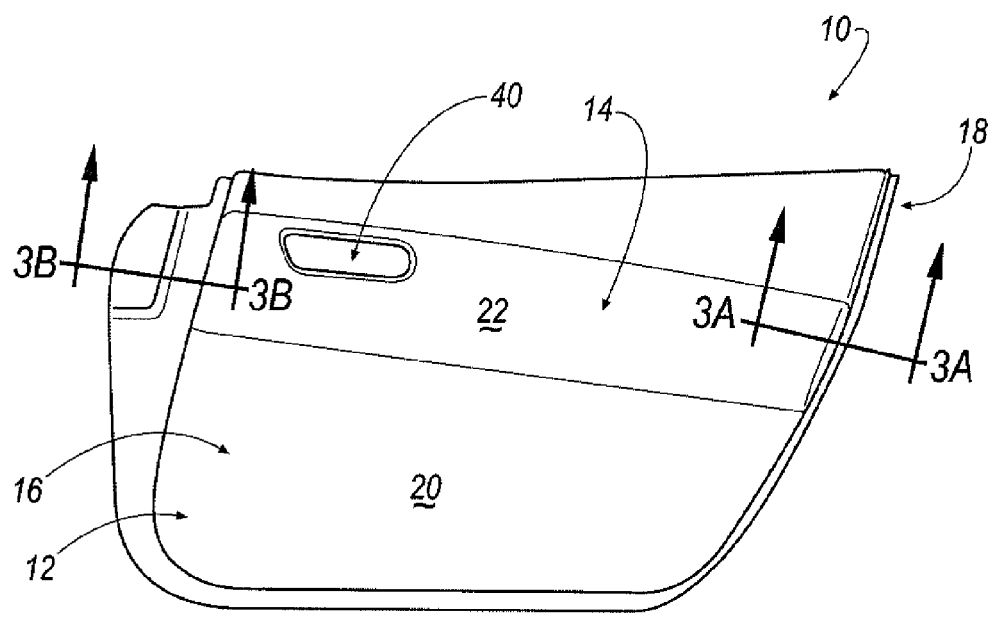
FIG. 1 is a perspective view of an interior trim component in accordance with an exemplary embodiment of the invention.

The Figures illustrate an exemplary embodiment of an interior trim component and method of manufacturing the same in accordance with an embodiment of the invention. It is to be generally understood that the nomenclature used herein is simply for convenience and the terms used to describe the invention should be given the broadest meaning by one of ordinary skill in the art.

Referring to FIGS. 1-3B, an interior trim component is shown generally at 10 according to an embodiment. The interior trim component 10 is defined to include a vehicular door geometry such that the interior trim component 10 functions as a panel for trimming vehicular door structure (not shown). Although the interior trim component includes a vehicular door geometry, it will be appreciated that the interior trim component 10 is not limited to a particular geometry; as such, the interior trim component 10 may include a geometry that trims vehicular roof structure, instrument panel structure, pillar structure, or the like.

The interior trim component 10 is further defined to include a first portion, which is shown generally at 12, and a second portion, which is shown generally at 14. Because the interior trim component 10 is formed to include a vehicular door geometry, the first portion 12 may be referred to as a body portion and the second portion 14 may be referred to as a bolster portion.

When joined to door structure, the interior trim component 10 defines an A-surface 16 that faces and is exposed to a passenger compartment area of a vehicle and a B-surface 18 that faces the door structure. If desired, the body portion 12 is defined to include a first A-surface portion 20 defined by a first color, and the bolster portion 14 is defined to include a second A-surface portion 22 defined by a second color that is different from the first color.

It will be appreciated that an "A-surface" is a term of art that describes a surface that generally faces the passenger compartment of a vehicle, and, as such, may be alternatively referred to as an "inboard surface." Further, it will be appreciated that a "B-surface" is a term of art that describes a surface that generally faces away from the passage compartment of a vehicle, and, as such, may be referred to as an "outboard surface." Although the disclosure includes the terms A-/inboard surface and B-/outboard surface, it will be appreciated that the above terms are used in reference to an embodiment of the invention and therefore do not limited the invention to a particular embodiment. The terms used to describe the invention should be given the broadest meaning by one of ordinary skill in the art.

The first and second A-surface portions 20, 22 may be further defined to include an A-surface texture/grain characteristic. The A-surface portion 20 of the body portion 12 may be defined to include, for example, a first A-surface texture/grain, and the A-surface portion 22 of the bolster portion 14 may be defined to include, for example, a second A-surface texture/grain that is different from the first A-surface texture/grain.

According to an embodiment, the first A-surface texture/grain maybe defined by a relatively smooth A-surface texture/grain, and the second A-surface texture/grain may be defined by a leather or fabric A-surface texture/grain. It will be appreciated that above-described A-surface texture/grains are not limited to a smooth, leather, or fabric texture/grain and that any desirable A-surface texture/grain pattern may define the first and second A-surface portion 20, 22 of the interior trim component 10.

In general, the body portion 12 may be defined by a three-dimensional, substantially rigid substrate material defining the vehicle door geometry. Although the bolster portion 14 includes a thickness, T (FIG. 3B), to define a three-dimensional geometry, the bolster portion is generally defined to include a two-dimensional unit of material that is applied over the body portion 12. Once the bolster portion 14 is applied over the body portion 12, the bolster portion 14 defines a decorative, aesthetically-pleasing A-surface portion 22. According to an embodiment, the bolster portion 14 may define a fabric, leather, or faux leather unit of material.

Referring to FIGS. 3A and 3B, prior to applying the bolster portion 14 to the body portion 12, an adhesive may be sprayed onto a rear, B-surface 24 of the bolster portion 14. According to an embodiment, the adhesive is applied over the entire B-surface 24 except as shown at 26a and 26b. However, it will be appreciated that the adhesive may be applied over the A-surface portion 20 of the body portion 12 corresponding to the positioning of the bolster portion 14; if the adhesive is applied to the A-surface portion 20 of the body portion 12, the adhesive is not applied to the corresponding A-surface portion 20 where portions 26a, 26b of the bolster portion 14 contact or is otherwise placed proximate the body portion 12.

The first B-surface end portion 26a may define a first end portion of the bolster portion 14, which is shown generally at 28a. The second B-surface end portion 26b may define a second end portion of the bolster portion 14, which is shown generally at 28b. A portion between the first end portion and the second portion is an intermediate portion.

According to an embodiment, the first end portion 28a includes a geometry that may be correspondingly-received within a U-shape valley or groove 30 formed in A-surface portion 20 of the body portion 12. According to an embodiment, the first end portion 28a is tucked into the U-shape valley or groove 30 in a tucking operation or process. According to an embodiment, the tucking operation or process may be defined by a well-known tucking technique that is commonly referred to in the art as "KimeKomi."

Referring to FIG. 3B, once the first end portion 28a is tucked into the U-shape valley or groove 30, the B-surface 24 including the adhesive is joined to the A-surface portion 20 of the body portion 12. Then, the second end portion 28b that does not include the adhesive is tucked through a corresponding opening or passage 32 defined by the body portion 12.

Figure 2:
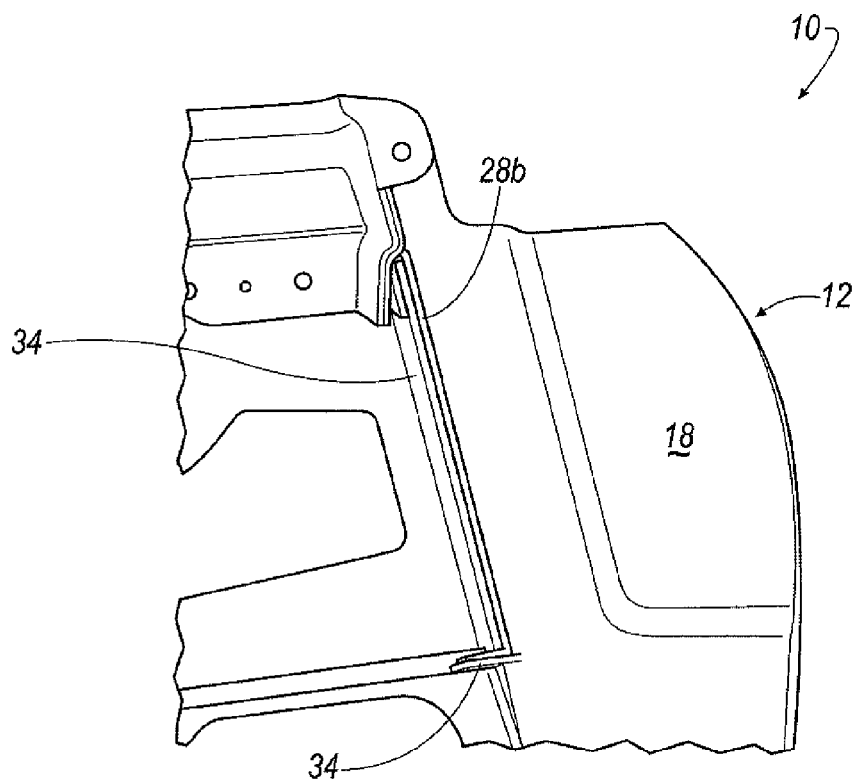
FIG. 2 is a partial perspective view of the interior trim component of FIG. 1 in accordance with an exemplary embodiment of the invention.

As seen in FIGS. 2 and 3B, the body portion 12 may includes one or more projections 34 that substantially perpendicularly extend away from the A-surface portion 20 and the B-surface 18. When the second end portion 28b is tucked through the opening or passage 32, the projections 34 may assist in the securing of the second end portion 28b.

According to an embodiment, the bolster portion 14 is defined to include a length and width such that when the second end portion 28b is tucked into the opening or passage 32, an end surface 36 (FIG. 3B) of the second end portion 28b may be substantially flat or flush with the B-surface 18 defined by the body portion 12. Accordingly, although the second end portion 28b may be defined by a projection 38 that extends past the B-surface 18 defined by the body portion 12, the control over the length and width sizing of the bolster portion 14 may reduce scrap material of the bolster portion 14 such that the occurrence and existence of projections 38 are minimized when the second end portion 28b is tucked into opening or passage 32.

Once the bolster portion 14 is attached to the body portion 12 as described above, additional processing steps may be carried out. For example, one or more of the bolster portion 14 and body portion 12 may be punched to define a door handle bezel opening 40 (FIG. 1) or the like.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An interior trim component comprising:
    a body portion defining an inboard-surface and an outboard-surface, the body portion defining a groove in the inboard-surface and a passage extending through the body portion from the inboard-surface to the outboard-surface; and
    a bolster portion including a first end portion and a second end portion, wherein the first end portion is disposed in the groove defined by the inboard surface and the second end portion is disposed in the passage.

2. The interior trim component according to claim 1, wherein an end surface of the bolster portion is arranged substantially flush with the outboard-surface of the body portion.

3. The interior trim component according to claim 1, wherein the bolter portion includes an intermediate portion arranged between the first and second end portions, a rear surface of the intermediate portion of the bolster portion secured to the body portion while allowing movement of the second end portion with respect to the body portion.

4. The interior trim component according to claim 1, wherein the groove formed in the inboard-surface of the body portion includes a substantially U-shape groove defining a valley.

5. The interior trim component according to claim 1, wherein the passage formed by the body portion is further defined by one or more projections that extend substantially perpendicularly from the inboard-surface.

6. The interior trim component according to claim 1, wherein the groove defines means for securing the first end portion of the bolster portion.

7. The interior trim component according to claim 1, wherein the passage defines means for securing the second end portion of the bolster portion.

8. A method for manufacturing an interior trim component, the method comprising:
    providing a body portion defining an inboard-surface and an outboard-surface, the body portion defining a groove in the inboard-surface and a passage extending through the body portion from the inboard-surface to the outboard-surface;
    providing a bolster portion including a first end portion and a second end portion;
    securing the first end portion of the bolster portion in the groove defined by the inboard-surface; and
    securing the second end portion of the bolster portion in the passage.

9. The method according to claim 8, wherein securing the first end portion comprises tucking the first end portion in the groove defined by the inboard-surface, and
    wherein securing the second end portion comprises tucking the second end portion in the passage.

10. The method according to claim 8, wherein securing the second end portion comprises locating an end surface of the bolster portion substantially flush with the outboard-surface of the body portion.

11. An interior trim component comprising:
    a body portion defining an inboard-surface and an outboard-surface, the body portion defining a groove in the inboard-surface and a passage extending through the body portion from the inboard-surface to the outboard-surface; and
    a bolster portion including a first end portion disposed in the groove defined by the inboard-surface, a second end portion disposed in the passage, and an intermediate portion arranged between the first and second end portions;
    wherein a rear surface of the intermediate portion of the bolster portion is secured to the body portion while allowing movement of the second end portion with respect to the body portion.

12. The interior trim component according to claim 11, wherein an end surface of the bolster portion is arranged substantially flush with the outboard-surface of the body portion.

13. The interior trim component according to claim 11, wherein the second end portion extends through the passage and past the outboard-surface of the body portion.

14. The interior trim component according to claim 11, wherein the second end portion extends within the passage and terminates prior to the outboard-surface of the body portion.

* * * * *